(12) United States Patent  
Greschitz et al.

(10) Patent No.: US 7,194,113 B2
(45) Date of Patent: Mar. 20, 2007

(54) CAPACITIVE BIOMETRIC SENSOR

(75) Inventors: Manfred Greschitz, Graz (AT); Klaus Gruber, Graz (AT); Franz Helminger, Graz (AT); Franz Wolf, Grambach (AT)

(73) Assignee: Infineon Technologies AG, Munich (DE)

( * ) Notice: Subject to any disclaimer, the term of this patent is extended or adjusted under 35 U.S.C. 154(b) by 830 days.

(21) Appl. No.: 10/272,342

(22) Filed: Oct. 15, 2002
(Under 37 CFR 1.47)

(65) Prior Publication Data

US 2003/0103873 A1    Jun. 5, 2003

Related U.S. Application Data

(63) Continuation of application No. PCT/EP01/03478, filed on Mar. 27, 2001.

(30) Foreign Application Priority Data

Apr. 14, 2000  (EP) ................... 00108253

(51) Int. Cl.
G06K 9/00 (2006.01)
B32B 5/02 (2006.01)
B32B 27/04 (2006.01)
B32B 27/12 (2006.01)
G01N 25/18 (2006.01)

(52) U.S. Cl. ............. 382/115; 382/124; 382/125; 382/126; 422/50; 422/68.1; 422/82.01; 436/149

(58) Field of Classification Search ............. 422/50, 422/68.1, 82.01; 436/149; 382/115, 126, 382/124, 125
See application file for complete search history.

(56) References Cited

U.S. PATENT DOCUMENTS

| 5,373,181 | A |   | 12/1994 | Scheiter et al. |
| 5,852,670 | A | * | 12/1998 | Setlak et al. ............ 382/126 |
| 5,862,248 | A | * | 1/1999  | Salatino et al. ......... 382/124 |
| 5,956,415 | A | * | 9/1999  | McCalley et al. ....... 382/124 |
| 5,963,679 | A | * | 10/1999 | Setlak .................. 382/312 |
| 5,982,608 | A |   | 11/1999 | Kalnitsky et al. |
| 6,664,612 | B2|   | 12/2003 | Willer et al. |

FOREIGN PATENT DOCUMENTS

| JP | 4 231 803     | 8/1992 |
| JP | 6 232 343     | 8/1994 |
| JP | 11 019 070 A  | 1/1999 |
| JP | 11 261 015    | 9/1999 |
| JP | 2000 201 907 A| 7/2000 |
| JP | 2000 337 813 A| 12/2000 |
| JP | 2001 060 261 A| 3/2001 |
| JP | 2001 208 509 A| 8/2001 |
| WO | WO 98/52157   | 11/1998 |
| WO | 00/03345      | 1/2000 |

* cited by examiner

*Primary Examiner*—Brian Sines

(74) *Attorney, Agent, or Firm*—Laurence A. Greenberg; Werner H. Stemer; Ralph E. Locher

(57) ABSTRACT

In a capacitive biometric sensor, in particular, a fingerprint sensor, to determine the maximum contrast that can actually be achieved in that application in the gray scale values, in particular, of a fingerprint (dynamic resolution of the sensor), at least one measurement point composed of a dielectric material is integrated above each of the sensor electrodes on a sensor array.

14 Claims, 2 Drawing Sheets

CAPACITIVE BIOMETRIC SENSOR

CROSS-REFERENCE TO RELATED APPLICATION

This application is a continuation of copending International Application No. PCT/EP01/03478, filed Mar. 27, 2001, which designated the United States and was not published in English.

BACKGROUND OF THE INVENTION

Field of the Invention

The invention relates to a capacitive biometric sensor, in particular, a fingerprint sensor, having a semiconductor sensor chip whose active surface, which can be touched by a person to be identified, is in the form of a sensor array having a large number of sensor electrodes disposed in a rectangular matrix and are covered by a protective layer that extends over the entire sensor array, with the sensor using the electrical pulses from each sensor electrode to produce a local, digitized gray scale value, and, in which case, these gray scale values can be evaluated further in their totality for identification.

Sensors such as these are already commercially available. In particular, the prior art sensor allows fingerprints to be read and evaluated reliably. Wherever the user still has to use personal secret numbers and passwords at the moment, for example, in the case of mobile telephones or PCs, check cards, and credit cards, in the future, the user's own finger will be sufficient. The rectangular sensor array optimizes the identification performance both for production of the reference data record and for each subsequent check. With an area of less than 160 mm$^2$, the sensor can even be used on very small equipment, in particular, even smart cards.

In contrast to the situation with the previously existing optical scanners, the capacitive sensor does not operate by "taking photographs" but substantially based upon 65,000 sensor electrodes, which are disposed alongside one another on the sensor array, and each represent one pixel, with the exact distance between the skin surface and the sensor respectively being measured locally when a finger is placed on the sensor array, thus, mapping the skin structure. The mapping is accomplished by utilizing the capacitance difference between the lines and troughs in the fingerprint, as results when a finger is placed on it, whose different points in each case form the opposing electrode for the sensor electrode that is located underneath such a point.

After less than 100 milliseconds, the sensor produces a digitized gray scale image of the fingerprint with a lateral resolution of 20 individual points per millimeter (513 dots per inch). Image processing software, then, evaluates the gray scale image based upon the characteristic features of the fingerprint, the so-called minutiae, and stores their appearance, position, and alignment. During the subsequent check, an evaluation algorithm compares the sensor image with the previously stored reference data. In a typical application, the enable signal for the sensor chip for activation of an item of equipment is produced only if the two data records match.

Correct use of the sensor is governed not only by the already mentioned horizontal fineness of the resolution in the plane of the sensor array, but, likewise, by depth or contrast resolution of each individual pixel that can be distinguished in this way. The 8-bit data resolution of each pixel results in a spectrum of 256 gray scale levels, with the gray scale value 0 in such a context representing "black" and the gray scale value 255 representing "white." An actual gray scale image of the fingerprint never covers this entire bandwidth, however. The maximum available local contrast is, in practice, in fact governed by the maximum difference between the first gray scale value, which corresponds to a finger line (skin moisture) and the second gray scale value, which corresponds to a finger trough (air). Normally, however, the frequency distribution of a number of individual contrast resolutions is considered in the form of a histogram. The distance between the two prominence maxima (that is to say, the skin moisture or water, on one hand, and air, on the other hand) is referred to as the dynamic resolution of the sensor.

At the moment, the dynamic resolution is determined either directly by placing a finger on the sensor, or by mechanical aids, which, likewise, involve contact. One suitable way to measure the so-called "water line" is, in principle, to fill the sensor array with water, although, in practice, a test stamp is normally used. The "air line" must be recorded in a second measurement, in which the sensor array is not covered.

The check of the dynamic resolution of each individual sensor chip should be carried out, in particular, at the end of the production process, especially if unserviceable sensor chips are not intended to be identified and possibly filtered out by complex electrical tests, but simply by checking or determining the central functional element of "dynamic resolution". However, previous capacitive sensors make it necessary to use the already described complex way of determining the dynamic resolution.

SUMMARY OF THE INVENTION

It is accordingly an object of the invention to provide a capacitive biometric sensor that overcomes the hereinafore-mentioned disadvantages of the heretofore-known devices of this general type and that determines the dynamic resolution easily, especially without any external aids involving contact.

With the foregoing and other objects in view, there is provided, in accordance with the invention, a capacitive biometric sensor, including a semiconductor sensor chip having an active surface to be touched by a person to be identified, the active surface being a sensor array having sensor electrodes disposed in a rectangular matrix, each of the sensor electrodes generating electrical pulses to produce a local, digitized gray scale value to be evaluated within a totality of gray scale values of the sensor electrodes for identification of the person, a protective layer covering the sensor electrodes and extending over an entirety of the sensor array, and measurement points of a dielectric material, at least one of the measurement points being integrated above each of the sensor electrodes to determine a maximum contrast that can actually be achieved in an application in the gray scale values. In particular, the capacitive biometric sensor is a fingerprint sensor.

According to the invention, in the capacitive fingerprint sensor at least one measurement point composed of a dielectric material is integrated above each of the sensor electrodes on the sensor array to determine the maximum contrast that can actually be achieved in that application in the gray scale values (dynamic resolution of the sensor).

For measuring the dynamic resolution, the measurement points that are provided according to the invention make it possible to use the sensor characteristics themselves, in order to check the quality of the sensor without any mechanical contact. While, in principle, a single pixel covered by a measurement point is, itself, sufficient for determining the dynamic resolution, far-reaching measurement capabilities are provided, in addition, as the number of measurement points increases and, in particular, with them being distributed uniformly over the sensor array.

In accordance with another feature of the invention, the protective layer has an upper face, the measurement points are produced by structuring the upper face, and a passivation layer covers the protective layer and the measurement points integrated in the protective layer and extends over an entirety of the sensor array. The measurement points can be formed by a structuring of the upper face or can each be a structured portion of the upper face.

In accordance with a further feature of the invention, the measurement points are distributed uniformly over the sensor array.

With the objects of the invention in view, there is also provided a capacitive biometric sensor, including a semiconductor sensor chip having an active surface to be touched by a person to be identified, the active surface being a sensor array having signal output lines, sensor electrodes disposed in a rectangular matrix, each of the sensor electrodes connected to one of the signal output lines and producing an electrical pulse on a respective one of the signal output lines corresponding to a local, digitized gray scale value, each gray scale value being part of an evaluation of a totality of gray scale values for identification of the person, a protective layer covering the sensor electrodes and extending over an entirety of the sensor array, and measurement points of a dielectric material, at least one of the measurement points being integrated above each of the sensor electrodes to determine a maximum contrast that can actually be achieved in an application in the gray scale values.

Other features that are considered as characteristic for the invention are set forth in the appended claims.

Although the invention is illustrated and described herein as embodied in a capacitive biometric sensor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
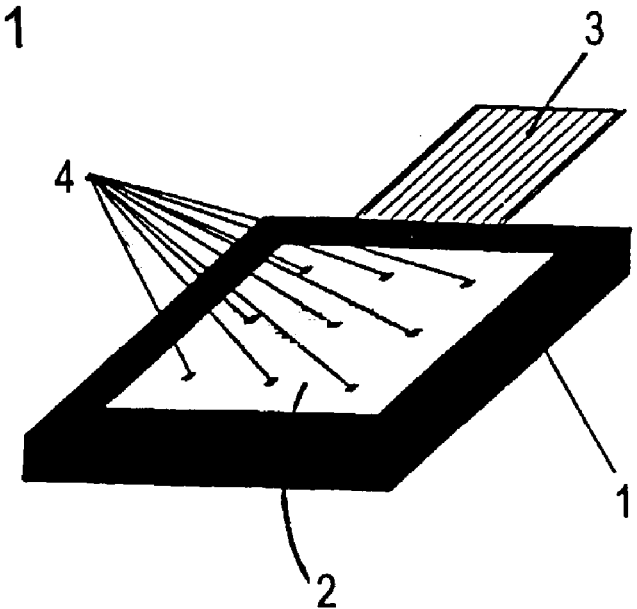
FIG. 1 is a perspective view from above of a sensor according to the invention.

Referring now to the figures of the drawings in detail and first, particularly to FIG. 1 thereof, there is shown, by way of example, a sensor chip 1 manufactured using the CMOS semiconductor technology, which is known per se. The active area of the sensor chip is defined by the rectangular sensor array 2, on which the finger to be identified is placed during operation. The data, which is preferably already digitized in the sensor chip 1, may, for example, be connected to further data chips, in particular, image-processing and storage chips, by the illustrated flexible ribbon 3, that is to say, a flexible printed circuit. The sensor chip 1 may, in principle, be integrated together with the memory and computer on a single smart card.

FIG. 1 also shows the small measurement points 4 that are integrated on the surface of the sensor. Even the nine measurement points 4 in this embodiment obviously allow good uniform distribution on the sensor array 2. In principle, the dynamic resolution results just from the difference between the gray scale values of a pixel that is covered by a measurement point 4 and one of the surrounding pixels that is covered only by air. On the other hand, the small number of measurement points 4 do not noticeably interfere with the lateral resolution in such an application, that is to say, when a finger is placed on the array, not least because missing pixels can be expected in any case, due to the method of manufacture.

Figure 2:
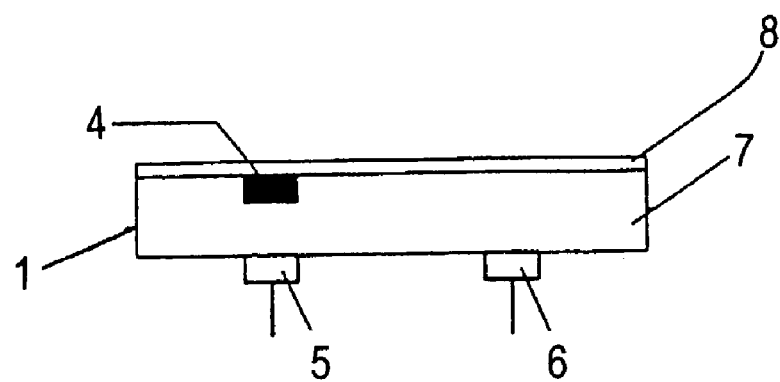
FIG. 2 is a cross-sectional view of the sensor of FIG. 1.

As is shown in FIG. 2, the measurement point 4 that is associated with a specific sensor electrode 5 is located precisely above the respective sensor electrode 5. All the sensor electrodes 5, 6 are covered in a conventional manner over the entire sensor array 2 by a protective layer 7, composed of silicon oxide, for example. The integration of the measurement points 4 in the surface of the sensor chip 1 can be carried out using conventional process technologies. The dielectric, preferably metallic material for the measurement points 4 may be embedded in the protective layer 7, for example, by etching and subsequent filling. A subsequent chemical mechanical polishing (CMP) step leads to adequate planarization so that the sealing and mechanical load capacity of the sensor chip 1 can be reproduced subsequently by a further passivation layer 8.

Figure 3:
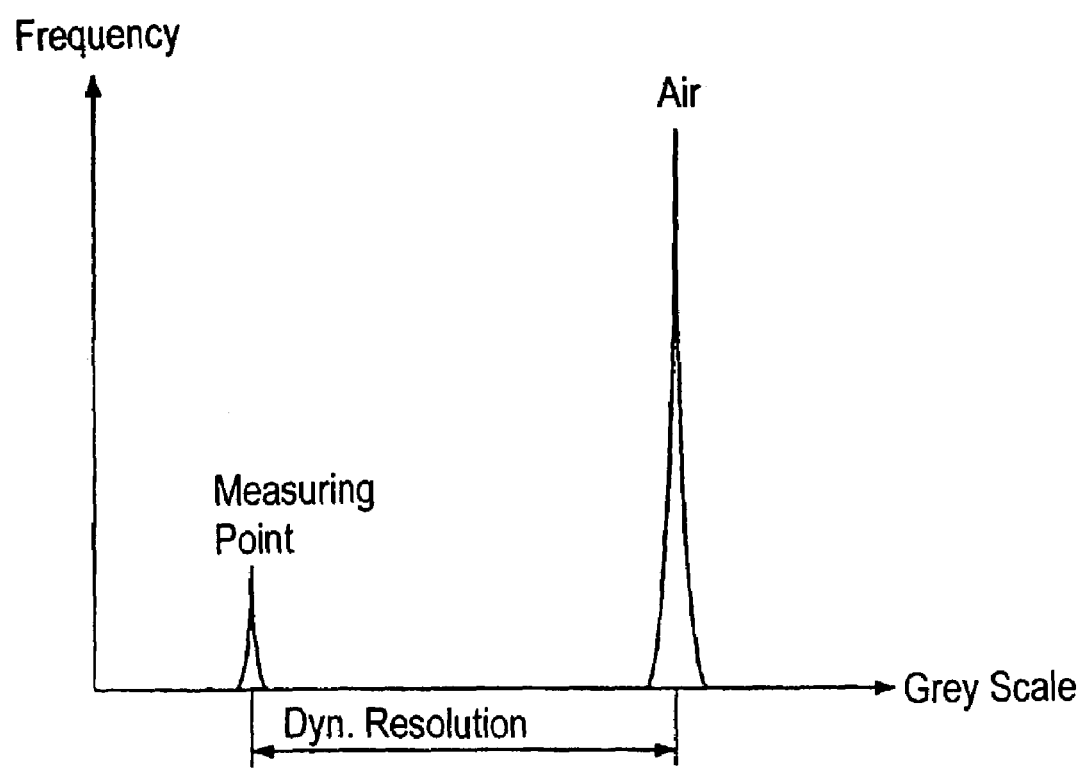
FIG. 3 is a histogram graph of measurement values recorded with the sensor according to the invention.

When the blank image is read, the sensor chip 1 now measures the dielectric constant of the covered pixels with respect to those that are covered by air. The dynamic resolution is the difference between the covered pixels and the other pixels in the histogram as shown in FIG. 3. Thus, first of all, the test software reads an image. The data supplied from the sensor is displayed in the form of a histogram. Such display results in two prominences, one from the pixels that are covered by measurement points and the second from the considerably greater number of pixels that are covered only by air. The dynamic resolution of the sensor is obtained most easily from the difference between the maxima of the two prominences.

The lateral position of the "measurement points" prominence in FIG. 3 does not necessarily match the position of the "water line" because it depends on the actual capacitive characteristics of the measurement points 4. It is, thus, either possible to choose the material and the configuration etc. of the measurement points 4 such that this results at least approximately in a match, or to empirically determine a shift factor, in order to deduce the position of the fictional "water line" from the position of the "measurement points" prominence.

The advantages of the capability to determine the dynamic resolution of the sensor according to the invention without making contact with it initially include the lack of the additional mechanism that was previously required for such a test. Thus, undesirable secondary influences are also avoided, for example, a different contact pressure. The handling of the measurement by the operator is simplified, which results in a considerable reduction of the measurement time because only one difference measurement is now required; while, with the previous test stamp method, two measurements (air/water) have to be carried out successively.

If there are a sufficient number of measurement points 4, and they are distributed uniformly over the sensor array 2, it is possible to determine the uniformity of the thickness of the protective layer 7, which is in the micrometer range. A broad prominence or a number of peaks in the histogram shown in FIG. 3 show that the protective layer 7 was not manufactured uniformly.

The measurement points 4 are, likewise, advantageous for correct use of the sensor for identification. The evaluation software may use the measurement points 4 for calibration. Individual contrast control is, thus, possible for each sensor, by matching the voltage level of the sensor electrodes.

We claim:

1. A capacitive biometric sensor, comprising:
   a semiconductor sensor chip having an active surface to be touched by a person to be identified, said active surface being a sensor array having:
   sensor electrodes disposed in a matrix to produce a local, digitized gray scale value each, by electrical pulses obtained from said sensor electrodes, said gray scale values to be evaluated within a totality of gray scale values of said sensor electrodes for identification of the person;
   a protective layer covering said sensor electrodes and extending over an entirety of said sensor array; and
   measuring points formed by a dielectric material integrated above only some of said sensor electrodes to determine a maximum contrast that can actually be achieved in an application in the gray scale values, others of said sensor electrodes not being covered by said dielectric material for sensing ambient conditions.

2. The capacitive sensor according to claim 1, wherein:
   said protective layer has an upper face;
   each of said measurement points is produced by structuring said upper face; and
   a passivation layer:
     covers said protective layer and each of said measurement points integrated in said protective layer; and
     extends over an entirety of said sensor array.

3. The capacitive sensor according to claim 1, wherein:
   said protective layer has an upper face;
   each of said measurement points are formed by a structuring of said upper face; and
   a passivation layer:
     covers said protective layer and each of said measurement points integrated in said protective layer; and
     extends over an entirety of said sensor array.

4. The capacitive sensor according to claim 1, wherein:
   said protective layer has an upper face;
   said measurement points each are a structured portion of said upper face; and
   a passivation layer:
     covers said protective layer and each of said measurement points integrated in said protective layer; and
     extends over an entirety of said sensor array.

5. The capacitive sensor according to claim 1, wherein said measurement points are distributed uniformly over said sensor array.

6. The capacitive sensor according to claim 1, wherein the capacitive biometric sensor is a fingerprint sensor.

7. The capacitive sensor according to claim 1, wherein the maximum contrast that can actually be achieved in an application in the gray scale values is a dynamic resolution of the sensor.

8. A fingerprint sensor, comprising:
   a semiconductor sensor chip having an active surface to be touched by a person to be identified, said active surface being a sensor array having:
   sensor electrodes disposed in a rectangular matrix, each of said sensor electrodes generating electrical pulses to produce a local, digitized gray scale value to be evaluated within a totality of gray scale values of said sensor electrodes for identification of the person;
   a protective layer covering said sensor electrodes and extending over an entirety of said sensor array; and
   at least one measurement point of a dielectric material being integrated above only one of said sensor electrodes to determine a maximum contrast that can actually be achieved in an application in the gray scale Values.

9. A capacitive biometric sensor, comprising:
   a semiconductor sensor chip having an active surface to be touched by a person to be identified, said active surface being a sensor array having:
   signal output lines;
   sensor electrodes disposed in a matrix, each of said sensor electrodes connected to one of said signal output lines and each producing on a respective one of said signal output lines a local, digitized gray scale value, by electrical pulses obtained from said sensor electrodes, each gray scale value being part of an evaluation of a totality of gray scale values for identification of the person;
   a protective layer covering said sensor electrodes and extending over an entirety of said sensor array; and
   measuring point formed by a dielectric material integrated above only some of said sensor electrodes to determine a maximum contrast that can actually be achieved in an application in the gray scale values, others of said sensor electrodes not being covered by said dielectric material for sensing ambient conditions.

10. The capacitive sensor according to claim 9, wherein:
    said protective layer has an upper face;
    each of said measurement points is formed by a structuring of said upper face; and
    a passivation layer:
      covers said protective layer and each of said measurement points integrated in said protective layer; and
      extends over an entirety of said sensor array.

11. The capacitive sensor according to claim 9, wherein:
    said protective layer has an upper face;
    each of said measurement points each are a structured portion of said upper face; and
    a passivation layer:
      covers said protective layer and each of said measurement points integrated in said protective layer; and
      extends over an entirety of said sensor array.

12. The capacitive sensor according to claim 9, wherein said measurement points are distributed uniformly over said sensor array.

13. The capacitive sensor according to claim 9, wherein the capacitive biometric sensor is a fingerprint sensor.

14. The capacitive sensor according to claim 9, wherein the maximum contrast that can actually be achieved in an application in the gray scale values is a dynamic resolution of the sensor.

* * * * *